(No Model.)

C. AVERITT.
COUPLING FOR CLEVISES.

No. 413,840. Patented Oct. 29, 1889.

Witnesses:
Geo. E. Frech.
W. F. Lwall

Inventor
Converse Averitt

By his Attorneys,
C. A. Snow & Co.

UNITED STATES PATENT OFFICE.

CONVERSE AVERITT, OF BLAKELY, GEORGIA.

COUPLING FOR CLEVISES.

SPECIFICATION forming part of Letters Patent No. 413,840, dated October 29, 1889.

Application filed June 6, 1889. Serial No. 313,300. (No model.)

*To all whom it may concern:*

Be it known that I, CONVERSE AVERITT, a citizen of the United States, residing at Blakely, in the county of Early and State of Georgia, have invented a new and useful Coupling for Clevises, of which the following is a specification.

The object of this invention is to provide a coupling adapted for the connection with clevises of singletrees, and this in such a manner as to automatically uncouple when the plow or cultivator to which the clevis is attached, and consequently the clevis, are thrown to a horizontal position, as when dragging when the horse attached thereto is running away, and to thereby prevent the horse from being injured by the cultivator or plow.

The invention consists in the provision of a clevis the front end of which is provided with a double key-hole slot, and in the further provision of a coupling device one end of which is swiveled to the singletree and the opposite end of which terminates in a key or arrow-shaped head designed to enter the key-hole slot and to be turned when so entered and locked against withdrawal.

Figure 1:
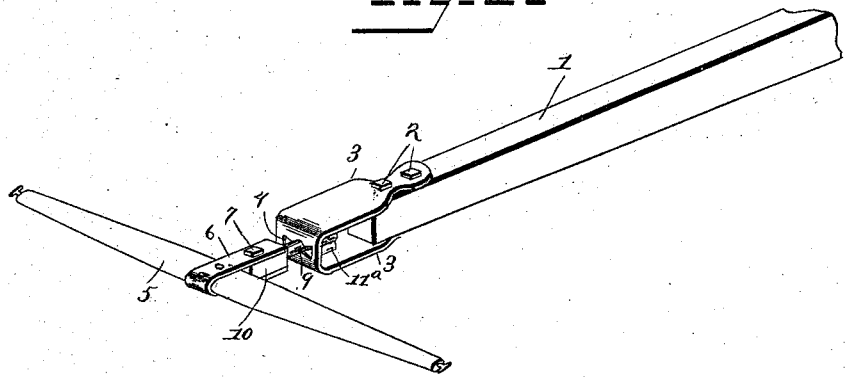
Figure 2:
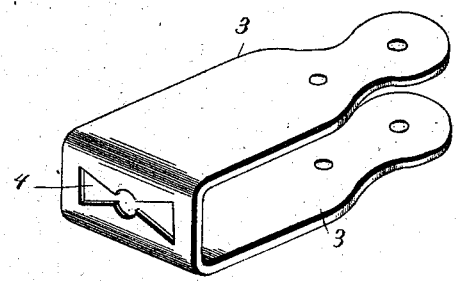
Figure 3:
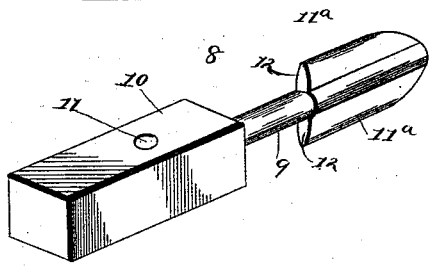

Referring to the drawings, Figure 1 represents a perspective of a cultivator or plow clevis, the singletree of which is connected therewith by a device constructed in accordance with my invention. Fig. 2 is a detail perspective of a clevis, and Fig. 3 of the coupling device.

Like numerals of reference indicate like parts in all the figures of the drawings.

1 represents a cultivator or plow beam, to the forward end of which is secured by bolts 2 the clevis 3, and the same consists of a U-shaped blank, the ends of which embrace the beam and are bolted thereto, as described, and provided at its front or U end with a double key-hole slot 4.

5 represents the singletree, which at its center is provided with a clip 6, the ends of which are perforated for the reception of a pin or bolt 7.

8 represents the coupling device, which consists of the shank portion 9, which terminates at its forward end in a square lug 10, perforated, as at 11, to receive the pin 7, whereby it is swiveled in the clip 6 to the singletree, and said shank 9 at its rear end is provided with opposite flanges 11ª, which give the rear end of the coupler an arrow-head appearance in plan. These flanges are horizontal and terminate a short distance back of their points, thus forming shoulders 12 at each side of the shank 9.

The operation of my invention will be at once apparent and may be briefly stated, as follows: By turning the singletree so as to assume a vertical position or by laying the plow down upon the ground the double key-hole slot in the clevis will be brought to a horizontal position, and in the same is introduced the arrow-headed coupling. Now, by raising the plow the slot and head will be at right angles to each other, and the shoulders 12 will take against the edges of the clevis at each side of the slot.

It will be observed that by reason of the slot being formed in key-hole shape a narrow neck portion is formed at each side of the opening which receives the shank 9, and so also are the flanges reduced in thickness at the opposite points of connection with the shank, and in this manner after the coupling has been introduced into the slot and said coupling partially rotated the coupling is maintained at about the center of the slot and prevented from falling to the lower end of the double key-hole slot. Now, if by accident the plow should overturn and the horses start or kick, or in any manner jerk, the coupling will readily be withdrawn by such action from the clevis and the animals be freed and not liable to become entangled with the plow and injured.

Having described my invention, what I claim is—

The combination, with the beam 1, having the clevis-strap 3 bolted to the sides thereof, and the horizontal key-hole slot 4, in combination with the singletree 5, the block 10, and the clip 6, for connecting the block and tree, and the key 8, having the shank 9, and vertical fins 11ª, adapted to fit within the slot 4, substantially as specified.

In testimony that I claim the foregoing as my own I have hereto affixed my signature in presence of two witnesses.

CONVERSE AVERITT.

Witnesses:
G. D. OLIVER,
WM. H. ROBINSON.